(12) United States Patent
Li

(10) Patent No.: US 8,605,439 B2
(45) Date of Patent: Dec. 10, 2013

(54) ELECTRONIC DEVICE WITH MECHANISM FOR SECURING CONNECTOR THEREOF

(75) Inventor: Min-Li Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 58 days.

(21) Appl. No.: 13/476,033

(22) Filed: May 21, 2012

(65) Prior Publication Data

US 2013/0286596 A1  Oct. 31, 2013

(30) Foreign Application Priority Data

Apr. 25, 2012 (CN) .......................... 2012 1 0122151

(51) Int. Cl.
*H05K 7/20* (2006.01)
*H01R 13/533* (2006.01)

(52) U.S. Cl.
USPC ............ 361/719; 361/704; 361/720; 439/487

(58) Field of Classification Search
None
See application file for complete search history.

(56) References Cited

U.S. PATENT DOCUMENTS

| | | | | |
|---|---|---|---|---|
| 4,539,621 | A * | 9/1985 | Currier | 361/718 |
| 6,269,863 | B1 * | 8/2001 | Wyler | 165/80.3 |
| 6,442,028 | B2 * | 8/2002 | Yamazaki | 361/704 |
| 6,890,202 | B2 * | 5/2005 | Yasufuku et al. | 439/331 |
| 7,210,957 | B2 * | 5/2007 | Mrakovich et al. | 439/404 |
| 2001/0043462 | A1 * | 11/2001 | Yamazaki | 361/704 |
| 2008/0096399 | A1 * | 4/2008 | Goh | 439/55 |
| 2011/0301906 | A1 * | 12/2011 | Snider et al. | 702/108 |

* cited by examiner

*Primary Examiner* — Gregory Thompson
(74) *Attorney, Agent, or Firm* — Altis Law Group, Inc.

(57) ABSTRACT

An electronic device includes a circuit board, a connector fixed on the circuit board, and a heat sink mounted on the circuit board. The heat sink includes a securing portion. The securing portion defines a first cutout, a second cutout, and an arm located between the first and second cutouts. The arm resiliently urges the connector against the circuit board so as to firmly hold the connector between the heat sink and the circuit board.

4 Claims, 3 Drawing Sheets

ELECTRONIC DEVICE WITH MECHANISM FOR SECURING CONNECTOR THEREOF

BACKGROUND

1. Technical Field

The present disclosure relates to an electronic device with a mechanism for securing a connector thereof.

2. Description of Related Art

Connectors are commonly used in electronic devices. Usually, the connector is welded on a circuit board or a housing of the electronic device. In use, a coupling connector is repeatedly plugged into and unplugged from the connector, which may cause the connector to be tilted or otherwise deviated from its original position, which can cause the connection pins in the connector to be fractured.

Therefore, what is needed is an electronic device with a mechanism for securing a connector thereof to alleviate the limitations described above.

BRIEF DESCRIPTION OF THE DRAWINGS

The components in the drawings are not necessarily drawn to scale, the emphasis instead being placed upon clearly illustrating the principles of an electronic device with a mechanism for securing a connector thereof. Moreover, in the drawings, like reference numerals designate corresponding parts throughout the several views.

DETAILED DESCRIPTION

Figure 1:
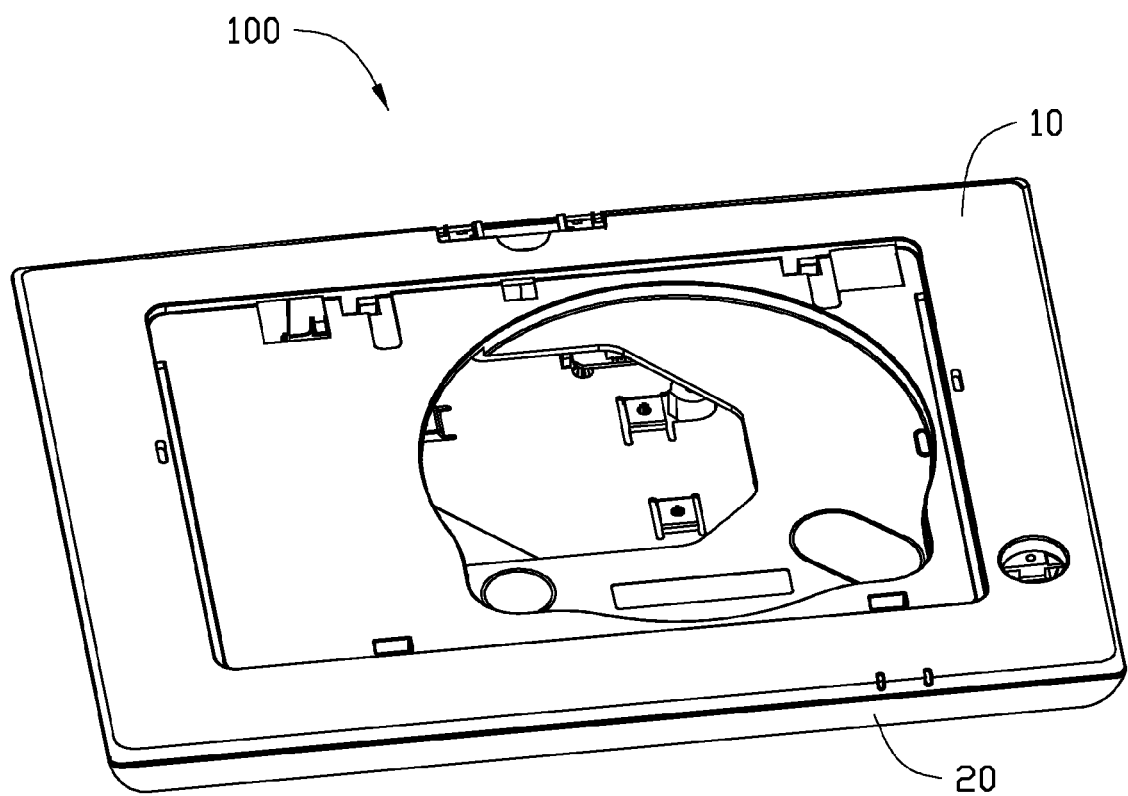
FIG. 1 is an isometric, cutaway view of an exemplary embodiment of an electronic device with a connector.

Referring to FIG. 1, an electronic device 100 with a connector is disclosed as an exemplary embodiment. The electronic device 100 includes an upper cover 10 and a rear cover 20 coupled to the upper cover 10. In the embodiment, the electronic device 100 is a DVD (Digital Video Disc) player.

Figure 2:
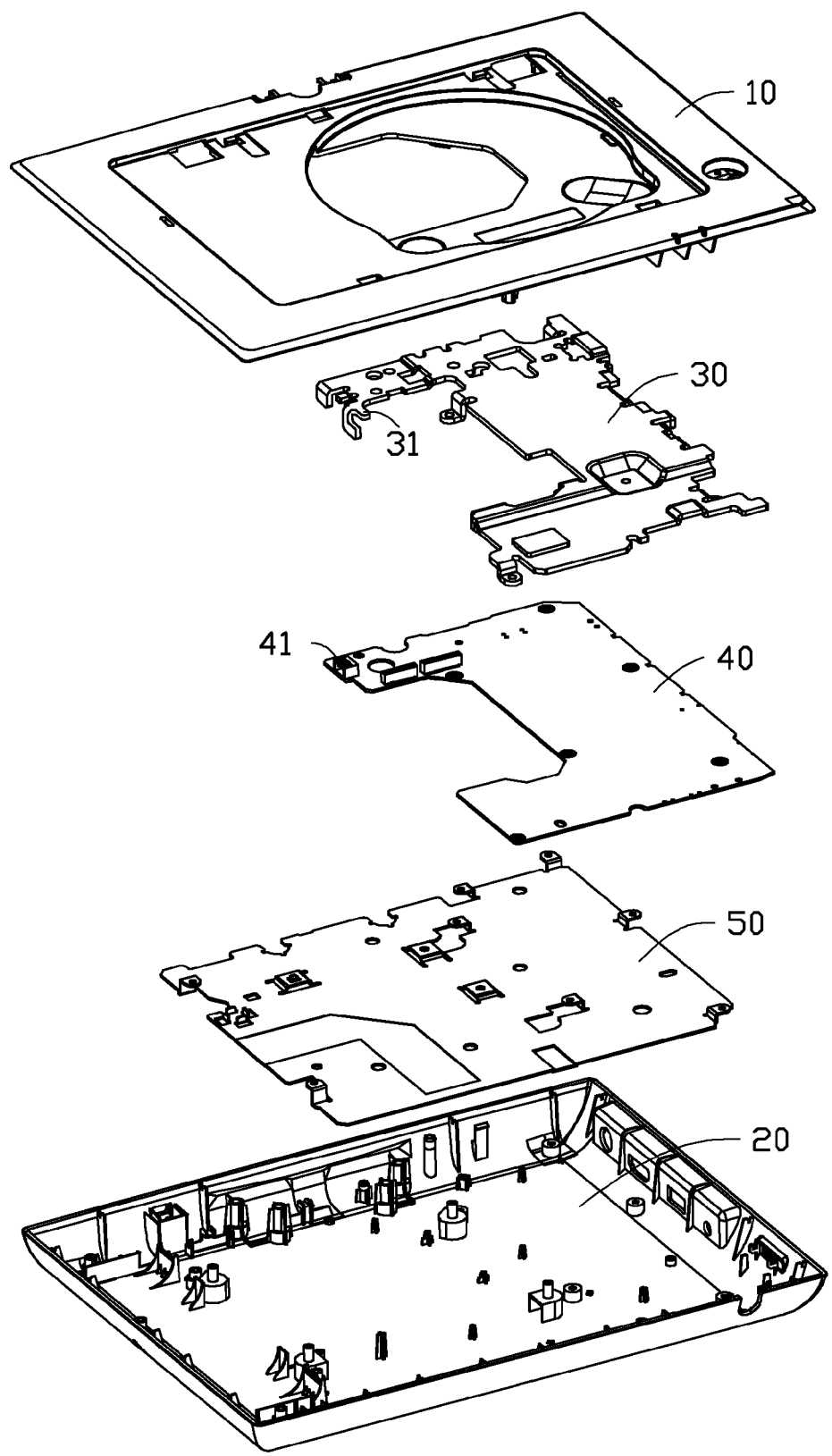
FIG. 2 is an exploded view of the electronic device of FIG. 1.
Figure 3:
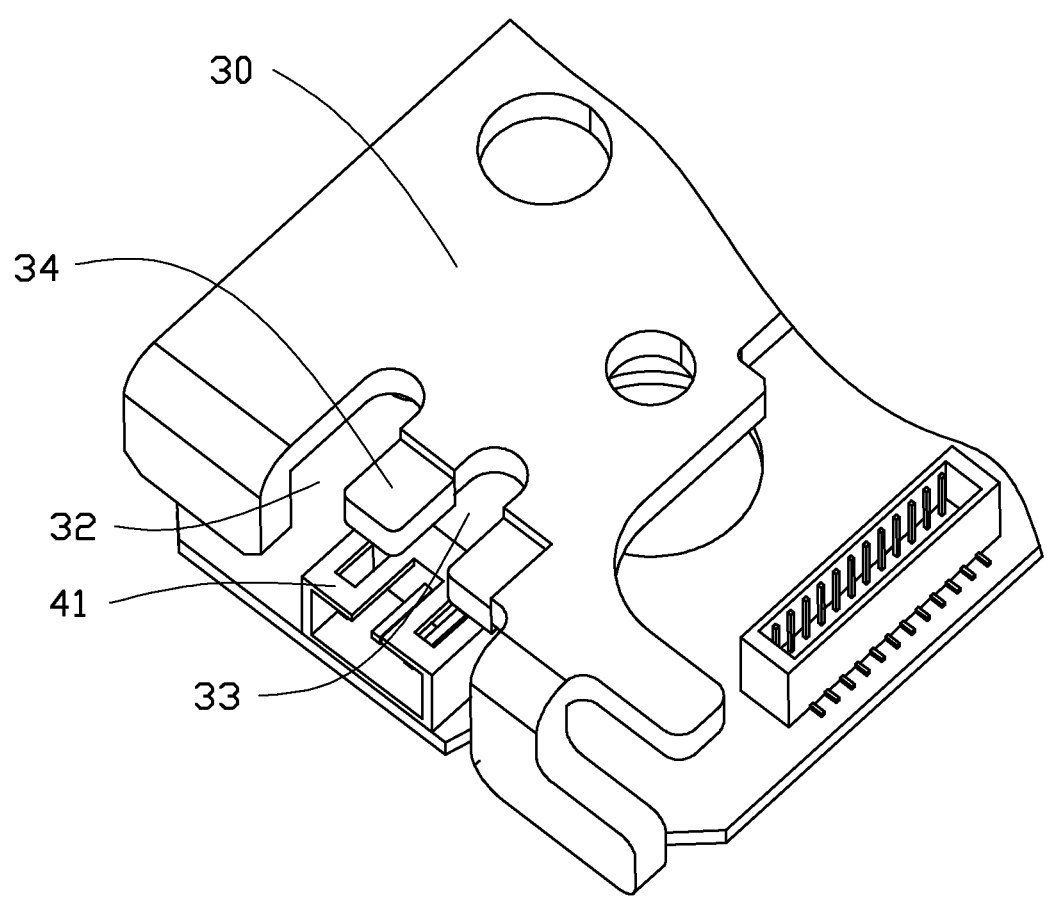
FIG. 3 is a partial enlarged view of the electronic device of FIG. 1.

Referring to FIGS. 2 and 3, the electronic device 100 further includes a heat sink 30, a circuit board 40, and an electrostatic shield 50 arranged between the upper cover 10 and the rear cover 20 in sequence. The heat sink 30 is mounted on the circuit board 40.

A connector 41 is fixed on the circuit board 40 adjacent to one edge of the circuit board 40. The heat sink 30 includes a securing portion 31 on the edge of the heat sink 30 and corresponding to the position of the connector 41. The securing portion 31 defines a first cutout 32, a second cutout 33, and an arm 34 located between the first and second cutouts 32, 33. The first and second cutout 32, 33 are U-shaped. The arm 34 resiliently urges the connector 41 against the circuit board 40 so as to firmly hold the connector 41 between the heat sink 30 and the circuit board 40. In other embodiments, the securing portion 31 may include more than one arm.

With such a configuration, because the connector 41 is resisted against by the securing portion 31, when a coupling connector (not shown) is plugged into or unplugged from the connector 41, the connector 41 is prevented from being tilted, thus the pins of the connector 41 are protected from being fractured.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
   a circuit board;
   a connector fixed on the circuit board; and
   a heat sink mounted on the circuit board, the heat sink comprising a securing portion, the securing portion defining a first cutout, a second cutout, and an arm located between the first and second cutouts; the arm resiliently urging the connector against the circuit board so as to firmly hold the connector between the heat sink and the circuit board.

2. The electronic device as described in claim 1, wherein the first cutout and second cutouts are both U-shaped.

3. The electronic device as described in claim 1, wherein the connector is welded on an edge of the circuit board, and the securing portion is located on an edge of the heat sink.

4. The electronic device as described in claim 1, being a DVD player.

* * * * *